No. 687,865. Patented Dec. 3, 1901.
A. W. SOUTH & B. P. SAUNDERS.
PROGRAM CLOCK.
(Application filed Mar. 15, 1900.)

(No Model.) 4 Sheets—Sheet 1.

WITNESSES,
INVENTORS,
A. W. South and B. P. Saunders.
BY THEIR ATT'YS,
Higdon & Higdon.

No. 687,865. Patented Dec. 3, 1901.
A. W. SOUTH & B. P. SAUNDERS.
PROGRAM CLOCK.
(Application filed Mar. 15, 1900.)

(No Model.) 4 Sheets—Sheet 2.

WITNESSES: INVENTORS,
A. W. South and B. P. Saunders.
BY THEIR ATT'YS,
Higdon & Higdon.

No. 687,865. Patented Dec. 3, 1901.
A. W. SOUTH & B. P. SAUNDERS.
PROGRAM CLOCK.
(Application filed Mar. 15, 1900.)
(No Model.) 4 Sheets—Sheet 3.
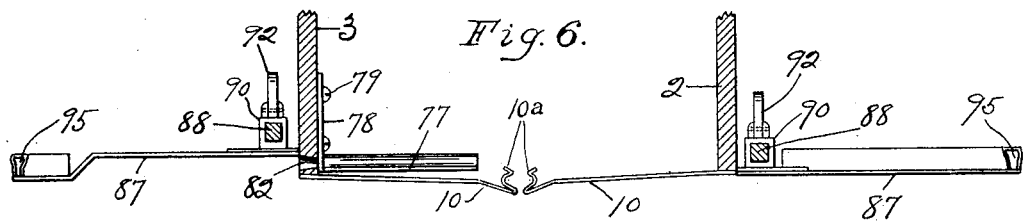
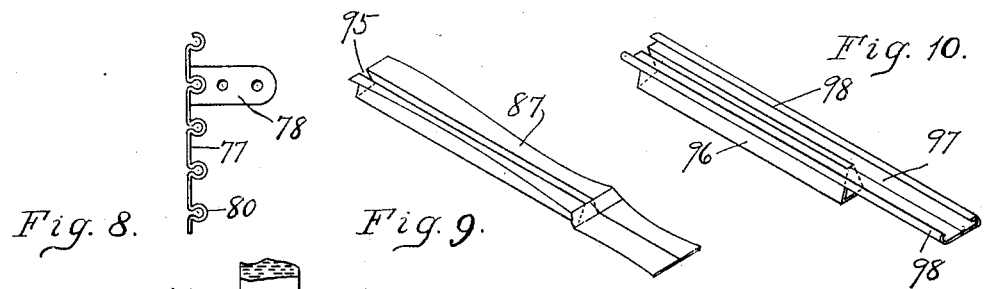
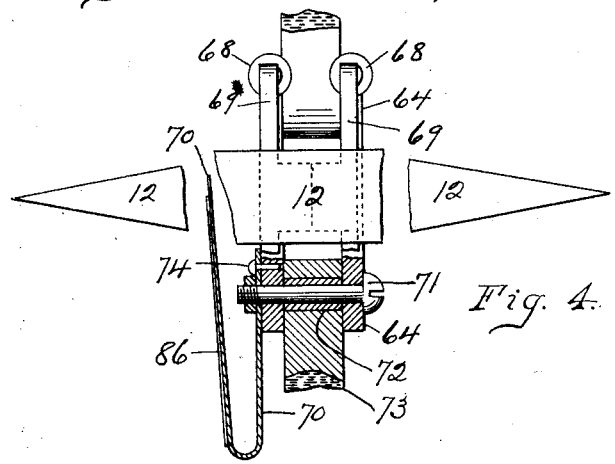
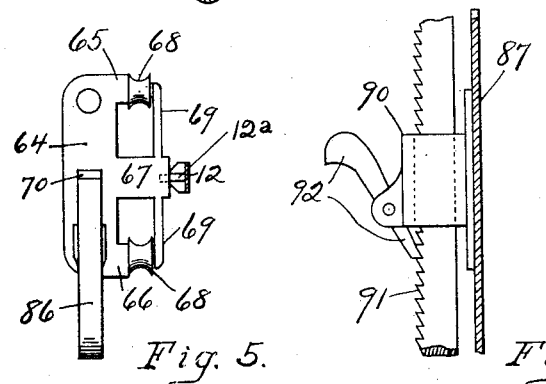
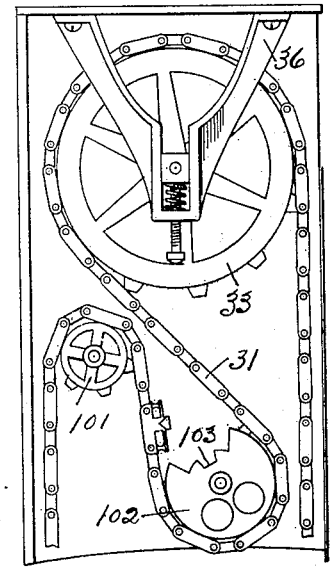
WITNESSES:
H. A. Spencer,
K. M. Imboden.
INVENTORS,
A. W. South and B. P. Saunders.
BY THEIR ATT'YS,
Higdon & Higdon.

No. 687,865. Patented Dec. 3, 1901.
A. W. SOUTH & B. P. SAUNDERS.
PROGRAM CLOCK.
(Application filed Mar. 15, 1900.)

(No Model.) 4 Sheets—Sheet 4.

WITNESSES,
K. M. Imboden,
M. L. Lange.

INVENTORS,
A. W. South and B. P. Saunders.
BY Higdon & Higdon,
THEIR ATT'YS.

UNITED STATES PATENT OFFICE.

AUGUSTUS W. SOUTH AND BENJAMIN P. SAUNDERS, OF IATAN, MISSOURI.

PROGRAM-CLOCK.

SPECIFICATION forming part of Letters Patent No. 687,865, dated December 3, 1901.

Application filed March 15, 1900. Serial No. 8,746. (No model.)

*To all whom it may concern:*

Be it known that we, AUGUSTUS W. SOUTH and BENJAMIN P. SAUNDERS, citizens of the United States, and residents of Iatan, in the county of Platte and State of Missouri, have invented certain new and useful Improvements in Program-Clocks, of which the following is a specification.

Our invention relates to improvements in program-clocks for indicating and announcing the time of the occurrence of a series of events or acts to be performed when the same are arranged in regular sequence and are to be repeated for a greater or less number of times, our device being especially applicable to use in schools for regulating the order of exercises, also in railway-stations for indicating and announcing the time of the departure and arrival of trains, and for a great variety of other purposes.

Our invention relates especially to program-clocks in which the dial is set vertically and the single pointer employed moves in a vertical slot in the center of the dial, the carriage upon which said pointer is mounted being in an electric circuit, so that when the pointer passes the various points on the dial at which the events are to occur an electrical contact is made and a signal sounded upon a bell or otherwise.

Figure 1:
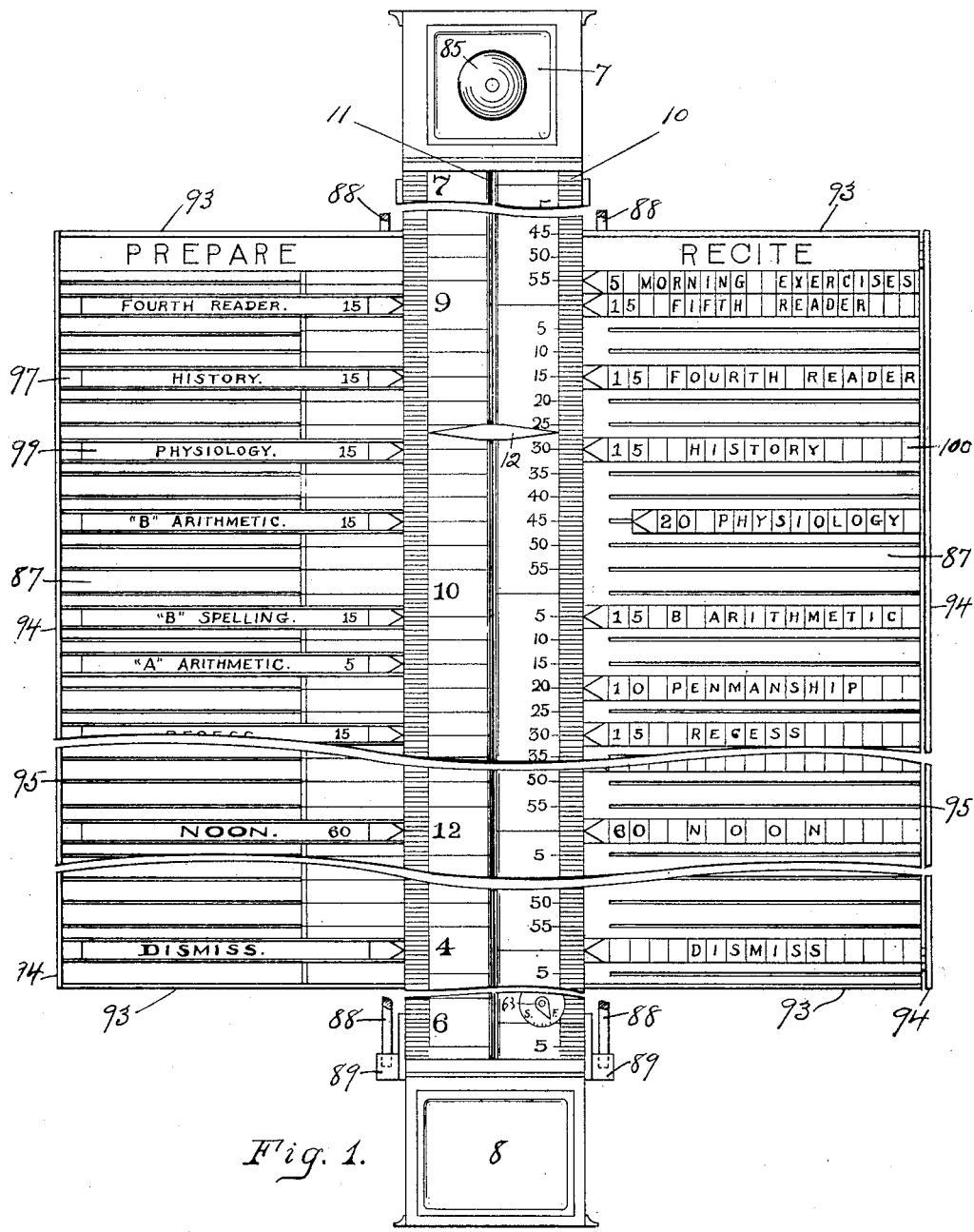
Figures 2, 3:
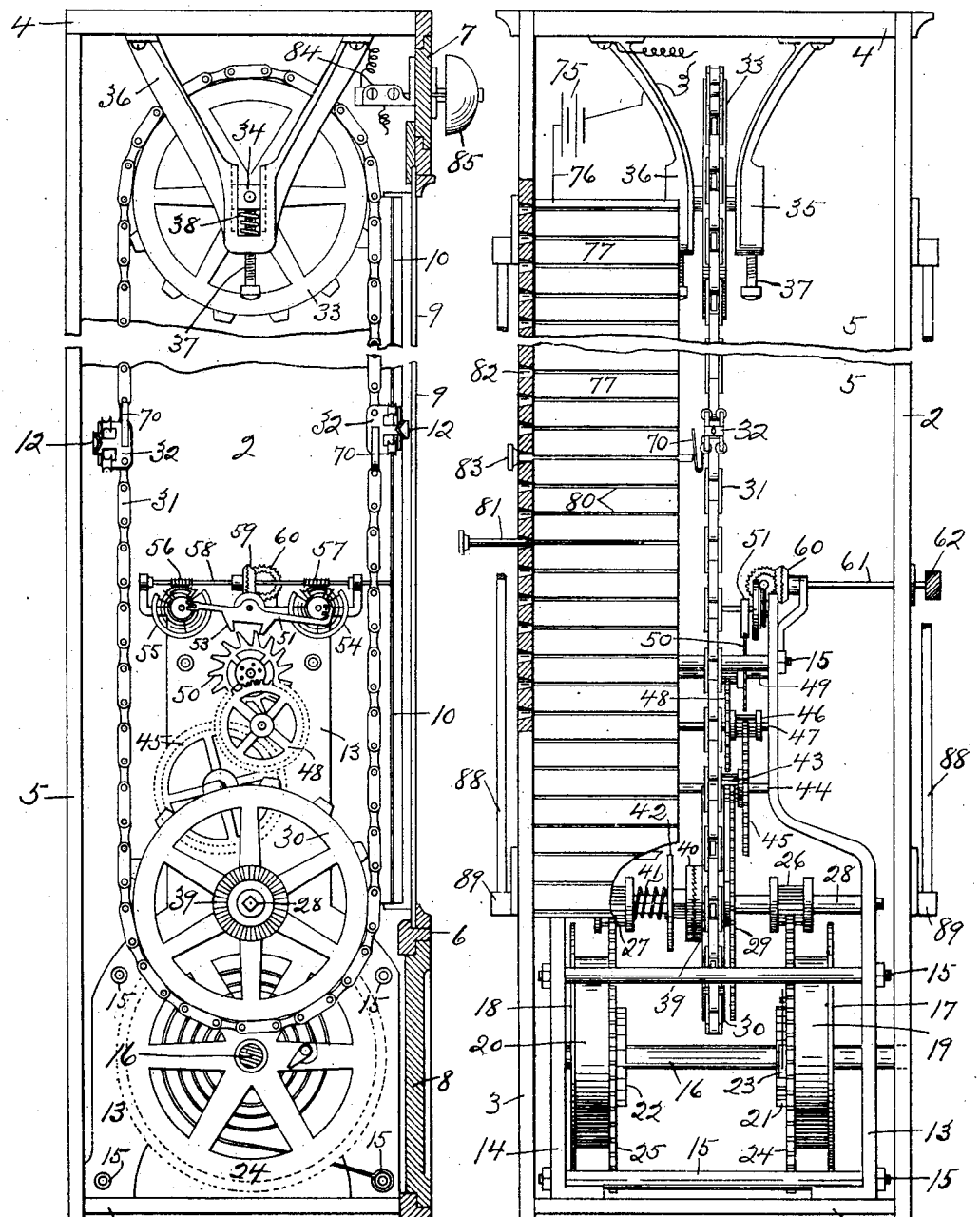
Figure 12:
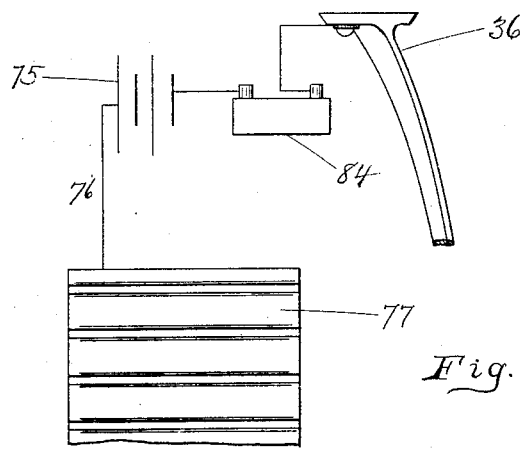
Figure 13:
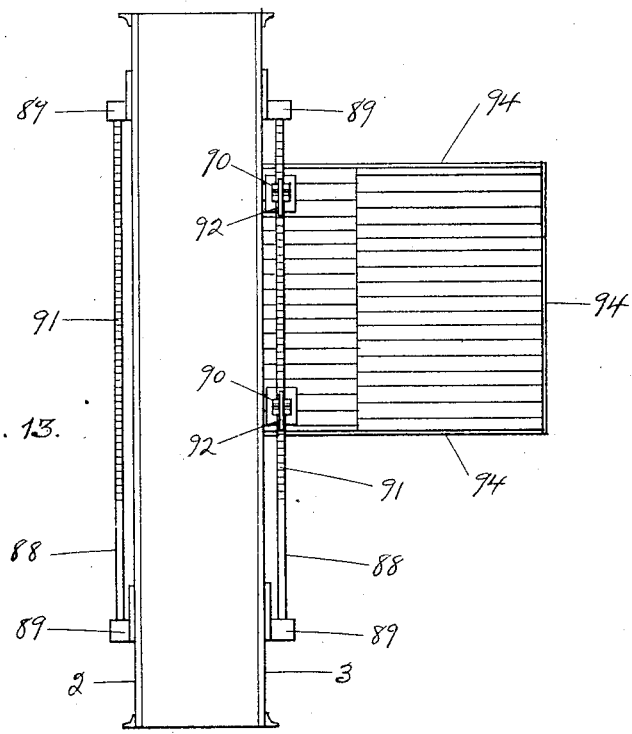

In the accompanying drawings, Figure 1 is a front elevation, with portions broken away, of the clock with the program-frames attached thereto upon each side. Fig. 2 is a front elevation, with a part broken away, of the clock with the program-frames, casing, glass front, and dial-plate removed. Fig. 3 is an elevation, partly in section, with a part broken away, of the left-hand side of the clock with the side casing and parts of the clockwork and other mechanism removed. Fig. 4 is a front elevation, partly in vertical section and partly broken away, of the pointer-carriage and pointer. Fig. 5 is a side elevation of the carriage. Fig. 6 is a partial horizontal section through the clock, dial, and program-frames with other parts omitted. Fig. 7 is a side elevation, partly in section, showing the manner of supporting the program-frames herein described on the sides of the clock. Fig. 8 is a vertical cross-section through a portion of a contact-plate herein described. Fig. 9 is a perspective view of a portion of one of the program-frames, showing the construction of the grooves therein. Fig. 10 is a perspective view of one of the slides fitting said grooves. Fig. 11 is a partial elevation showing a modification of the adjustment of a sprocket-chain herein described. Fig. 12 is a detail view of the battery, bell, one of the sprocket-hangers, the upper end of the contact-plate, and the wires connecting these parts together. Fig. 13 is a rear elevation of the clock-case, showing one of the program-frames and the means of attaching it to the case.

The clock proper consists, preferably, of an elongated rectangular wood casing having a bottom 1, sides 2 3, top 4, back 5, and front 6. The front is provided with upper and lower doors 7 8 and a glass panel 9, covering the greater portion of the front face of the clock, and within said panel is a vertical dial 10, attached to the sides 2 3, as shown, and provided with a central vertical slot 11, in which double pointers 12 move downwardly to indicate the various subdivisions of time marked on the dial.

While our invention is capable of a wide range of uses, we have selected for the purpose of convenient illustration and as a specially useful and advantageous application of the device a program of school exercises, the times fixed for which are to be indicated on the dial by the pointer and announced by the bell. When utilized for this purpose, the various recitations, study-hours, intermissions, &c., composing the school routine are indicated upon sliding display cards, tablets, blocks, or otherwise removably attached to program-frames, hereinafter described, arranged upon each side of the dial. The dial is marked to indicate upon one side the hours from seven to six, reading downward, and upon the other the minutes at intervals of five minutes each. Two pointers are provided, one of which disappears from view at the bottom of the dial at six o'clock and the other comes into view at the top of the dial at seven o'clock. The inscriptions on the slides in the program-frames may be such as are preferred by the teacher. In the example given in Fig. 1 the periods allotted to preparation for the various recitations are indicated on the left-hand side, and upon the right the recitations or exercises and the time to be occupied by each. It is obvious that all these inscriptions may be varied at will, according to the nature of the program to be carried out, the slides, blocks, &c., being removable and interchangeable, as hereinafter described.

The mechanism for actuating the vertically-moving pointers will now be described. In the lower portion of the casing are secured two metal frames 13 14, rigidly connected by cross-rods 15. A shaft 16, journaled in said frames, carries, fixed thereto, a pair of circular plates 17 18, a pair of driving-springs 19 20, abutting against said plates, and a pair of ratchet-wheels 21 22. Said ratchet-wheels engage pawls 23, carried by spur-wheels 24 25, journaled on shaft 16, meshing with lantern-pinions 26 27, fixed on a shaft 28, which carries a spur-gear 29. Said shaft 28 also has loosely journaled on it a sprocket drive-wheel 30, over which passes a sprocket-chain 31, which carries the pointer-carriages 32 and engages a sprocket-wheel 33 at the top of the clock. Said wheel 33 is journaled in blocks 34 in hangers 35 36, said blocks being provided with screws 37 and springs 38 to secure a proper yielding adjustment. Wheel 30 carries a clutch member 39, which meshes with a corresponding member 40, which rotates with shaft 28, but is movable on it longitudinally. A spring 41, which presses against a plate 42, keeps the clutch members normally in mesh; but they may be disengaged by back pressure by the hand on plate 42, so that the sprocket wheels and chain may be moved independently of the clockwork when desired. The spur-gear 29 meshes with a lantern-pinion 43 on a shaft 44, carrying a gear 45, which meshes with a pinion 46 on a shaft 47, carrying a gear 48, which meshes with a pinion on a shaft 49, which carries the escapement-wheel 50. Above said wheel 50 is mounted an escapement-lever 51, the pallets of which, 53, engage the teeth of said wheel. Two balance-wheels 54 55 are provided, engaging the ends of said lever. The beats of said balance-wheels and the rate of movement of the clock may be regulated by worm-gears 56 57 on a spindle 58, which spindle is geared by bevel-gears 59 60 to a shaft 61, Fig. 2, projecting through the side of the casing and carrying a thumb-wheel 62. Said worm-gears engage the teeth of the sectors which bear on the hair-springs connected to said balance-wheels in the usual manner. The spindle 58 carries an indicator located in a recess 63 of the dial and visible from the front of the clock.

When used for school purposes, the clock is provided with two pointer-carriages 32, which are so located on the chain 31 that the pointers carried by them will pass over the face of the dial 10 alternately. The body of said carriages consists, substantially, of two of the ordinary doubled links 64 of the chain 31, which links are, however, provided each with three forward or outward projections 65 66 67, the first two of which are adapted to form axes for antifriction-rollers 68, which bear against flanges $10^a$ on dial 10, forming the sides of the slot 11. The central projections 67 extend forward and are bent over, so as to meet each other on the front of the carriage, as shown in Fig. 5 and in dotted lines in Fig. 4. Said central projections 67 also have extensions 69, which bear against the axes of rollers 68 to hold said rollers in place. To one side of each carriage is attached a contact-spring 70 for making the electrical contacts, as hereinafter described. Said spring is secured on the carriage by the bolt 71, which holds together the doubled links 64, composing the carriage-body, by passing through it, which bolt 71 is surrounded by a sleeve 72, interposed between said links, which sleeve is made long enough to take the pressure off the single link 73, interposed between the doubled links 64. A pin or screw 74 above the bolt 71 prevents the spring 70 from turning on its seat. The double pointer 12 is attached to the front of each carriage by a pin or shank $12^a$.

A battery 75 is located in any convenient part of the casing, and one pole of the same is connected by an insulated wire 76 to a conducting-plate 77, located immediately underneath and parallel with the dial 10 upon one side of the clock. (See Figs. 2 and 8.) Said plate consists of a strip of sheet metal extending from the top to the bottom of the dial and secured to the adjacent side of the clock by ears 78, through which pass screws 79. Said plate is provided with corrugations or grooves 80, arranged at regular intervals corresponding to the five-minute divisions on the dial. Said grooves are adapted to receive contact-pins 81, of suitable conducting metal, which extend through flaring openings 82 in the adjacent side of the clock and are provided with external knobs 83 for convenient handling. Said pins are of such length that when pushed in to their limit they will lie in the path of the vertically-moving contact-springs 70 and make an electrical contact with them, the current passing through the chain and its connections in the upper part of the clock to an electromagnet 84, operating a signal-bell 85, and back to the battery. (See Figs. 2, 3, and 12.) As shown in Fig. 4, the lower portion of the outer surface of springs 70 is covered with insulating material 86, such as mica, extending nearly but not quite to the extreme tip of the spring, which tip is located exactly opposite the points of the pointer, so that the contact will be made and the signal rung at the instant the pointer reaches the divisional line on the dial corresponding with the contact-pin which has been pushed into the path of contact-spring 70. It is obvious that by a proper adjustment of the contact-pins a series of signals will be rung during the passage of the pointer down the dial at as many of the divisional lines as may be desired.

The program-frames 87 extend laterally on each side of the dial and substantially in the same plane. They are attached to the clock by means of square rods 88, set in sockets 89, secured to the sides of the clock at the top and bottom. The backs of said frames carry short sleeves 90, (see Figs. 2, 6, 7, and 13,) having rectangular openings to engage the rods. The rear faces of said rods are provided with notches 91, and said sleeves 90 carry gravity-pawls 92, which engage said notches to hold the frames at the desired height. (See Figs. 7 and 13.) As shown in Fig. 1, the frames being for school purposes correspond substantially with only that portion of the dial indicating the time from nine to four o'clock; but it is obvious that they may be made coextensive with the dial, as when utilized for railroad or other purposes.

The program-frames 87 are constructed of any preferred form of sheet metal, provided at the top and bottom with strengthening-borders 93 and at their outer lateral margins with hinged strips 94 to provide for the insertion or removal of the slides or blocks containing the inscriptions. The panels are provided at regular intervals with preferably angular corrugations which form horizontal dovetail grooves 95, (shown in detail in Fig. 9,) adapted to receive the correspondingly-dovetailed shanks 96 of sheet-metal slides 97, Fig. 10. Said slides have bent-over edges 98, adapting them to receive the announcement-cards 99, of cardboard or any preferred material. Said grooves 95 extend inward from the outer edge of the panel as far as may be desired, and the shanks 96 of the slides 97 are of equal length with said grooves. The card-holding portions of the slides are, however, of a length equal to the width of the panel, so that when in place on the panel they will extend inward to the edge of the dial. In the right-hand panel in Fig. 1 the inscriptions are shown as formed by a series of blocks 100, each block showing on its front face a letter or figure. Said blocks may be provided with dovetail shanks fitting the grooves of the panels, or they may be adapted to fit slides similar to 97, so that an entire line of inscription may be inserted or removed at once.

In practice the slides or blocks are arranged in the grooves of the program-frames in such number and order as may be desired. The contact-pins 81 are then inserted in the grooves in the contact-plate corresponding to the grooves in said frames in which the slides are contained, said pins being pushed in to their limit, so that their inner ends will lie in the path of the contact-spring 70. As the pointer-carriage passes downward said pins will successively contact with said spring and the signal will be operated.

Fig. 11 shows a modification of the construction of the upper part of the clock where it is desired to economize space by reducing the length of the clock-case to the minimum—that is, to the length of the dial. In this case two small sprocket-wheels 101 102 are mounted below the sprocket-wheel 33, and a loop is made in chain 31 by causing it to pass over said small wheels. To accommodate the pointer-carriages in this movement, an irregular recess 103 is formed in the peripheral edge of wheel 102 to receive the carriages as they pass around said wheel. The carriages are so located on the chain and the circumference of wheel 102 made such a fraction of the total length of the chain as to admit of this operation.

It is obvious that in adapting the devices described to the various uses of which they are capable numerous changes in details might and would be made. For example, in railroad-work the dial might, if preferred, be graduated for twenty-four hours, and the slides in the program-frames would indicate the trains to depart or arrive at fixed times and other events incident to railway travel. Other uses, as in connection with post-offices, hospitals, &c., can readily be provided for.

Having described our invention, we claim as new and desire to secure by Letters Patent—

1. A program-clock comprising a vertically-graduated dial provided with a vertical slot, a pointer adapted to traverse said slot, said pointer being in an electric circuit, means for actuating said pointer, an electric signaling device in circuit with said pointer, and means for automatically closing the electric circuit, when said pointer passes predetermined points on the dial, substantially as described.

2. A program-clock comprising a vertically-graduated dial provided with a vertical slot, a pointer adapted to traverse said slot, means for actuating said pointer, program-frames arranged at the sides of the clock, substantially in the plane of the dial, having subdivisions corresponding to the graduations of the dial, adjustable slides disposed in said subdivisions, for indicating the events to be announced, and means for attaching said frames to the clock, consisting of vertical angular rods, having ratchet-teeth, secured on the casing, and angular sleeves fixed on the backs of the frames, engaging said rods, and having pawls to engage said ratchet-teeth, substantially as set forth.

3. A program-clock comprising a vertically-graduated dial provided with a vertical slot, a pointer adapted to traverse said slot, program-frames arranged at the sides of the clock, substantially in the plane of the dial, adapted to receive slides or other devices for indicating the events to be announced, and means for actuating said pointer, consisting of a pair of sprocket-wheels mounted on transverse horizontal shafts within the casing, a sprocket-chain passing over said wheels, immediately behind and parallel with said slot, means for driving said sprockets, a train of clockwork and an escapement for regulating the speed thereof, and a pointer-carriage mounted on said chain and carrying said pointer, substantially as described.

4. In a program-clock of the character described, a pointer-carriage carried by the sprocket-chain, said carriage comprising a body formed essentially of two of the doubled links of the chain, antifriction-rollers mounted on said body, adapted to engage the edges of the slot in the dial, a pointer mounted on the front of said body, and a contact-spring secured to the side thereof, substantially as set forth.

5. In a program-clock, in combination, a main drive-wheel, a pinion driven thereby, a shaft carrying said pinion, a sprocket mounted rotatably on said shaft, a clutch member secured to said sprocket, consisting of a crown ratchet-wheel, a slidable crown ratchet-wheel mounted non-rotatably on said shaft and a coiled spring pressing said slidable crown ratchet member against the aforesaid clutch member; substantially as and for the purpose set forth.

In testimony whereof we affix our signatures in the presence of two witnesses.

AUGUSTUS W. SOUTH.
BENJAMIN P. SAUNDERS.

Witnesses:
JAMES DALEY,
WM. GROVER.